United States Patent
Ahn et al.

(10) Patent No.: US 9,168,989 B2
(45) Date of Patent: Oct. 27, 2015

(54) UNDERWATER ROBOT BASED ON FLAPPING

(75) Inventors: Sung Hoon Ahn, Seongnam-si (KR); Hyung Jung Kim, Seoul (KR); Sung Hyuk Song, Seoul (KR); Min Woo Han, Hwaseong-si (KR); Gil Yong Lee, Seoul (KR)

(73) Assignee: SNU R&DB Foundation, Seoul (KR)

( * ) Notice: Subject to any disclaimer, the term of this patent is extended or adjusted under 35 U.S.C. 154(b) by 272 days.

(21) Appl. No.: 13/530,723

(22) Filed: Jun. 22, 2012

(65) Prior Publication Data

US 2013/0210294 A1   Aug. 15, 2013

(30) Foreign Application Priority Data

Feb. 14, 2012  (KR) .................. 10-2012-0014687

(51) Int. Cl.
*B63H 1/36* (2006.01)
*H02N 2/00* (2006.01)
*B63G 8/08* (2006.01)
(Continued)

(52) U.S. Cl.
CPC .. *B63G 8/08* (2013.01); *B63H 1/32* (2013.01); *B63H 1/36* (2013.01); *H02N 2/028* (2013.01); *B63B 2035/007* (2013.01);
(Continued)

(58) Field of Classification Search
CPC .............. H01L 41/0926; H01L 41/094; H01L 41/0993; H01L 41/0966; G05B 2219/41342; H02N 2/028; B25J 9/1085
USPC ................ 310/330–333; 114/337; 440/13–17
See application file for complete search history.

(56) References Cited

U.S. PATENT DOCUMENTS 6,475,639 B2 *  11/2002  Shahinpoor et al. .......... 428/614
8,294,329 B2 *  10/2012  Yamamoto et al. .......... 310/300
(Continued)

FOREIGN PATENT DOCUMENTS

JP            4888570 B2    2/2012
KR      20120010882 A      2/2012

OTHER PUBLICATIONS

Kim, Hong-IL, "Flapping Actuator Modules Using IPMC", Master's Thesis presented to the Korea Advanced Institute of Science and Technology, School of Mechanical, Aerospace and Systems Engineering, Dept. of Aerospace Engineering, Daejeon, Korea; Obtained from the National Assembly Library, Jul. 30, 2007.

*Primary Examiner* — S. Joseph Morano
*Assistant Examiner* — Andrew Polay
(74) *Attorney, Agent, or Firm* — Andrew D. Fortney; Central California IP Group, P.C.

(57) ABSTRACT

Disclosed is an underwater robot based on flapping comprising: an actuator including a smart material and directional material, wherein the smart material is changed in its shape according to an external signal, and the directional material restricts a deformation in a specific direction; a body connected with the actuator; and a controller which makes the actuator perform a first stroke in a direction, and a second stroke in another direction being different from that of the first stroke; wherein the actuator performs at least one deformation of bending and twisting according to position of the smart material and directionality of the directional material, and furthermore enables to simultaneously perform the smooth bending and twisting motion with the simple structure by adjusting the position of the smart material functioning as the active component, and the directionality of the directional material functioning as the passive component.

20 Claims, 15 Drawing Sheets

(51) Int. Cl.
*H02N 2/02* (2006.01)
*B63H 1/32* (2006.01)
*B63G 8/00* (2006.01)
*B63B 35/00* (2006.01)

(52) U.S. Cl.
CPC ...... *B63B 2231/28* (2013.01); *B63G 2008/002* (2013.01); *B63G 2008/004* (2013.01)

(56) References Cited

U.S. PATENT DOCUMENTS

| | | | |
|---|---|---|---|
| 2003/0155842 A1* | 8/2003 | Hobelsberger | 310/331 |
| 2010/0253180 A1 | 10/2010 | Ohtera et al. | |
| 2011/0217544 A1* | 9/2011 | Young et al. | 428/327 |
| 2013/0220074 A1* | 8/2013 | Benjamin et al. | 74/99 R |

* cited by examiner

X-direction

Y-direction

Z-direction

UNDERWATER ROBOT BASED ON FLAPPING

CROSS REFERENCE TO RELATED APPLICATIONS

This application claims the benefit of the Korean Patent Application No. 10-2012-0014687 filed on Feb. 14, 2012, which is hereby incorporated by reference as if fully set forth herein.

BACKGROUND OF THE INVENTION

1. Field of the Invention

The present invention relates to an underwater robot based on flapping, which includes an actuator prepared with a smart material and directional material.

2. Discussion of the Related Art

Through recent studies, smart materials are widely used for various problems related with an active or passive control of structure. The material may be shape memory alloy. The smart materials may be directly attached to the structure, or may be inserted into another material to be used as an actuator.

Among the various smart materials, researches for preparing a shape memory alloy embedded composite may be as follows: Roger (Craig A. Rogers, "Active vibration and structural acoustic control of shape memory alloy hybrid composites: Experimental results," The Journal of the Acoustical Society of America, Vol. 88, No. 6, pp. 2803-2811, 1990); Baz (A. Baz, T. Chen, and J. Ro, "Shape control of NITINOL-reinforced composite beams," Composites: Part B, Vol. 31, pp. 631-642, 2000); Jung (B. S, Jung, M. S. Kim, Y. M. Kim, W. Y. Lee, and S. H. Ahn, "Fabrication of smart air intake structure using Shape Memory Alloy wire embedded composite," Physica Scripta, accepted, 2010); and Villanueva (A. A. Villanueva, K. B. Joshi, J. B. Blottmanm, and S. Priya, "A bio-inspired shape memory alloy composite (BISMAC) actuator," Smart Materials and Structure, Vol. 19, pp. 1-17, 2010).

There are researches for studying a small-sized robot using the shape memory alloy, for example, Kim (B. K Kim, M. G Lee, Y. P Lee, Y. I Kim and G. H Lee, "An earthworm-like micro robot using shape memory alloy actuator", Sensors and Actuators A 125 (2006) 429437); Koh (J. S Koh and K. J Cho, "Omegabot: Biominetic Inchworm Robot using SMA Coil Actuator and Smart Composite Microstructures (SCM)", International Conference on Robotics and Biominetics, Dec. 19-23, 2009, Guilin, China); and Kim (M. S. Kim, W. S. Chu, J. H. Lee, Y. M. Kim, B. S. Jung and S. H. Ahn, "Manufacturing of inchworm robot using Shape Memory Alloy (SMA) embedded composite structure," International Journal of Precision Engineering and Manufacturing, accepted, 2011).

Other smart structures may be multi-stable complex structures, and shape memory alloy composites.

The multi-stable complex structures may be a bi-stable morphing airfoil proposed by Diaconu (Diaconu, C. G., Weaver, P. M., Mattioni, F., Concepts for morphing airfoil sections using bi-stable laminated composite structures, Thin-Walled Structures 46 (6), pp. 689-701, 2008), and a multi-stable morphing wing proposed by Iannucci (L. Iannucci and A. Fontanazza, Design of Morphing Wing Structures, 3rd SEAS DTC Technical Conference, Edinburgh, 2008). These multi-stable complex structures are maintained in the deformed state without additional energy. However, these multi-stable complex structures are disadvantageous in that they can be deformed only in the designed shape, that is, it is difficult to change the structures to the various desired shapes.

The shape memory alloy embedded composites are most generally known as the smart structure, which have been actively studied by Lagoudas et al. 1994, Kawai et al. 1999, Murasawa et al. 2004, Khalili et al. 2007a, b, Yongsheng and Shuangshuang 2007, Zhou et al. 2004, Dano and Hyer 2003, and etc. These kinds of smart structure can be controlled to be deformed in the desired shape, but it needs additional energy. The aforementioned smart structures are limited only to hard matrix.

As mentioned above, the smart materials are widely used for various problems related with the active or passive control of structure.

However, even though the various results, deformation in most of the structures using the smart material is limited to linear deformation or out-of-plane bending deformation, and the degree of deformation is too low, thereby causing the limited utilization. Also, since the actuator occupies too large space in the entire structure, it is difficult to obtain a small-sized structure.

Furthermore, it needs a complicated structure for realizing the smooth and continuous motion (for example, the increased number of motors, and the increased number of joints).

SUMMARY OF THE INVENTION

Accordingly, the present invention is directed to an underwater robot based on flapping that substantially obviates one or more problems due to limitations and disadvantages of the related art.

An aspect of the present invention is to provide an underwater robot based on flapping, which facilitates to realize smooth bending and twisting motions for producing thrust by a simplified structure.

To achieve these and other advantages and in accordance with the purpose of the invention, as embodied and broadly described herein, there is provided an underwater robot based on flapping comprising: an actuator including a smart material and directional material, wherein the smart material is changed in its shape according to an external signal, and the directional material restricts a deformation in a specific direction; a body connected with the actuator; and a controller which makes the actuator perform a first stroke in a direction, and a second stroke in another direction being different from that of the first stroke; wherein the actuator performs at least one deformation of bending and twisting according to position of the smart material and directionality of the directional material.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an underwater robot based on flapping according to the present invention will be described with reference to the accompanying drawings.

According to the present invention, the underwater robot based on flapping is actuated by thrust produced in actuator. The actuator can realize strokes having different twisting angles according to position of a smart material and directionality of a directional material, whereby the actuator smoothly produces the thrust by a simplified structure.

Figure 1:
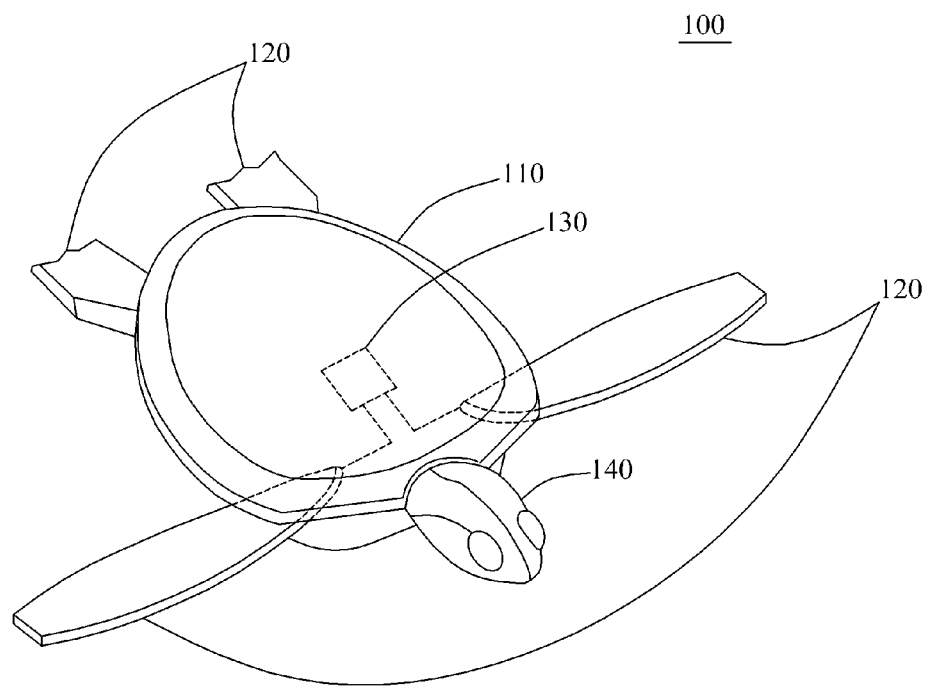
FIG. 1 illustrates a rough structure of underwater robot based on flapping according to the present invention.

FIG. 1 illustrates a rough structure of underwater robot based on flapping according to the present invention.

As shown in FIG. 1, the underwater robot based on flapping 100 according to the present invention includes a body 110, an actuator 120, and a controller 130. If needed, the underwater robot based on flapping 100 according to the present invention may further include a steering part 140 and/or link part (See 150 of FIG. 7) connected between the actuator 120 and body 110.

The body 110 is connected with the actuator 120 for producing the thrust. According to the size and position of the actuator 120, if needed, the actuator 120 may be subdivided into a main actuator and supplementary actuator. The actuator 120 is provided in such a manner that subdivided portions of the actuator 120 are symmetric with respect to the body 110, which enables to help steering as well as thrust.

The actuator 120 may include a smart material and directional material, wherein the smart material is changed in its shape according to an external signal, and the directional material restricts deformation in a specific direction. If needed, the actuator 120 may further include a matrix for determining an external shape.

Based on the position of smart material and the directionality of directional material, the actuator 120 may perform at least one deformation of bending and twisting. For producing the thrust, the actuator 120 repeats a first stroke in a first direction and a second stroke in a second direction, wherein the first and second directions are different from each other, for example, opposite directions.

Hereinafter, a motion for producing the thrust by repeating the first and second strokes of the actuator 120 based on the deformation of bending and twisting will be referred to as a flapping motion.

Figure 2:
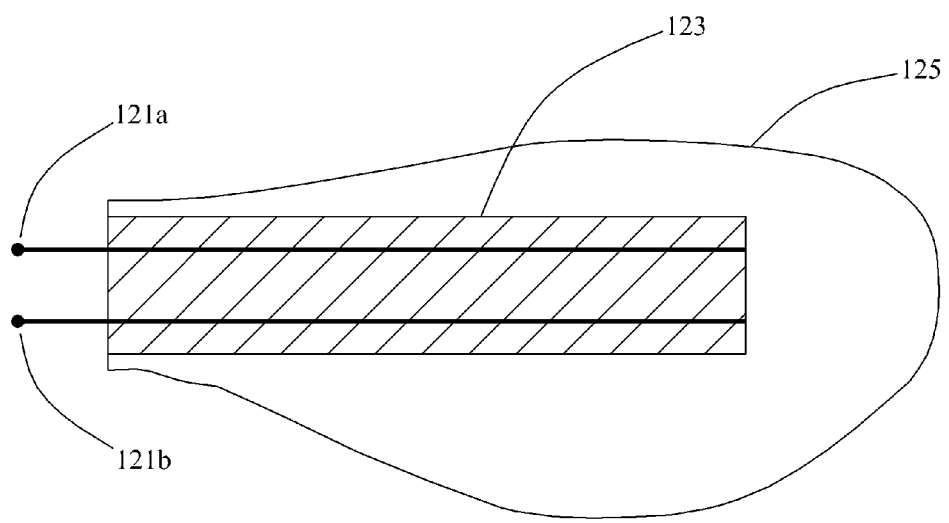
FIG. 2 is a plane view illustrating an actuator in an underwater robot based on flapping according to one embodiment of the present invention.
Figure 3A:
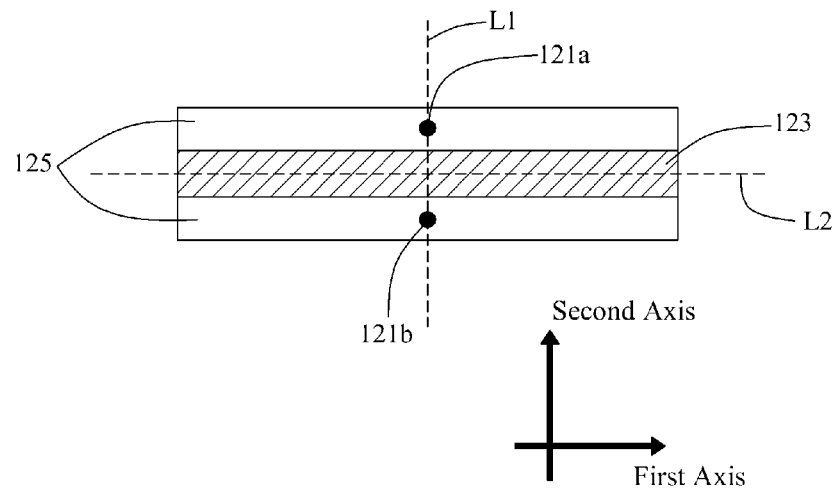
FIGS. 3A and 3B are cross sectional views illustrating various embodiments of actuators in an underwater robot based on flapping according to the present invention.
Figure 3B:
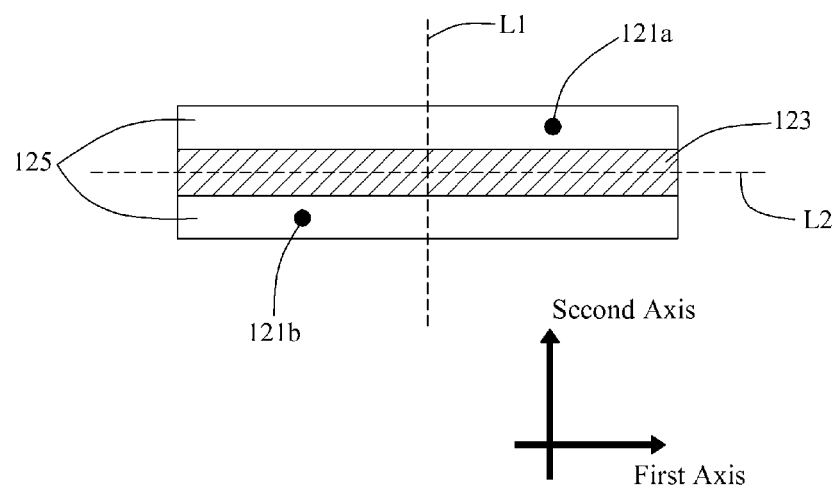
Figure 4:
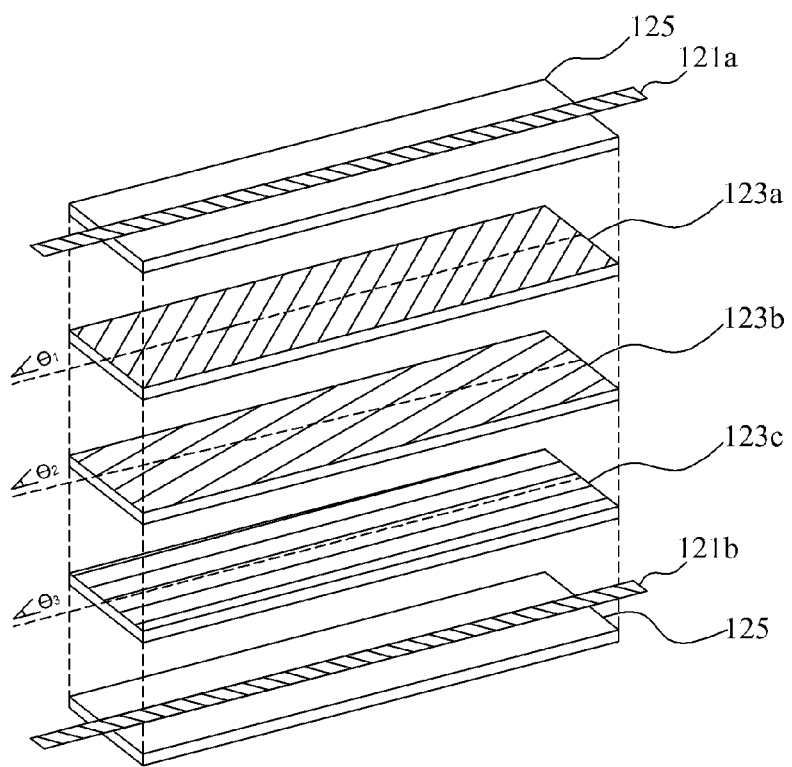
FIG. 4 is an exploded perspective view illustrating an actuator in an underwater robot based on flapping according to the present invention.

FIG. 2 is a plane view illustrating an actuator in an underwater robot based on flapping according to one embodiment of the present invention. FIGS. 3A and 3B are cross sectional views illustrating various embodiments of actuators in an underwater robot based on flapping according to the present invention. FIG. 4 is an exploded perspective view illustrating an actuator in an underwater robot based on flapping according to one embodiment of the present invention.

As shown in FIGS. 2 to 4, the actuator 120 includes smart materials 121a and 121b, a directional material 123, and a matrix 125.

The matrix 125 supports at least one of the smart materials 121a and 121b and directional material 123, and simultaneously determines the external shape. In order to improve efficiency for producing thrust, the matrix 125 may be formed in a streamline shape, for example, webbed feet of water animal.

The matrix 125 is formed of a soft material capable of supporting the smart materials 121a and 121b and enduring large deformation of the smart materials 121a and 121b, wherein the smart materials 121a and 121b may be positioned inside the matrix 125 or positioned in the surface of matrix 125. In more detail, it is preferable that the matrix 125 be formed of a material whose Young's modulus is not more than 1 GPa. The matrix 125 may be formed of elastomeric polymer, silicon, or polydimethylsiloxane (PDMS), but not necessarily. For the following description related with embodiments of the present invention, the matrix 125 will be the same as above, and repeated explanation will be avoided.

The smart materials 121a and 121b function as an active component for realizing the bending or twisting of the actuator 120. That is, the smart materials 121a and 121b may be changed in their shapes according to an external signal such as a current signal. The actuator 120 is deformed in accordance with an actuation of the smart materials 121a and 121b.

The smart materials 121a and 121b may be formed of shape memory alloy (SMA), piezoelectric element, ionic polymer and metal composite (IPMC), or conductive polymer (CP), but not necessarily. The smart materials 121a and 121b may be formed of any material which is changed in its shape according to the external signal such as the current signal. For the following description related with embodiments of the present invention, the smart materials 121a and 121b will be the same as above, and repeated explanation will be avoided.

The directional material 123 functions as a passive component for restricting deformation in a specific direction. Thus, if the smart materials 121a and 121b functioning as the active component for inducing deformation in a specific direction is harmoniously combined with the directional material 123 functioning as the passive component for restricting deformation in a specific direction, it is possible to realize various modifications of the actuator 120.

The directional material 123 is formed of a stiff material so as to function as the passive component. Especially, it is preferable that the directional material 123 be formed of a material whose Young's modulus is not less than 1 GPa.

The directional material 123 having the above properties may be prepared by weaving process of fiber, rapid prototyping process, or injection process. The prepared directional material 123 may be in a mesh structure, but not necessarily. The directional material 123 may be formed of various kinds of well-known fiber or ABS (acrylonitrile butadiene styrene copolymer) resin.

Hereinafter, the bending and twisting deformation of the actuator 120 according to the position of smart materials 121a and 121b and directionality of the directional material 123 will be described as follows.

A bending direction of the actuator 120 when the smart materials 121a and 121b are deformed varies according to the position of smart materials 121a and 121b. Also, a twisting direction and angle of the actuator 120 varies according to the directionality of directional material 123. Thus, it is necessary to appropriately position the smart materials 121a and 121b, and also to appropriately set the directionality of the directional material 123.

As shown in FIG. 3A, the smart materials 121a and 121b may be formed out of a horizontal central plane (L2) of the actuator 120, and simultaneously formed in a vertical central plane (L1) of the actuator 120. That is, the smart materials 121a and 121b may be apart from each other in a second axis direction with respect to the horizontal central plane (L2). Also, the directional material 123 is formed in the horizontal central plane (L2) of the actuator 120; and the smart materials 121a and 121b are symmetrically positioned while being opposite to each other with respect to the directional material 123.

The smart materials 121a and 121b may include at least one of the first smart material 121a for the first stroke, and at least one of the second smart material 121b for the second stroke. In this case, the first smart material 121a may be positioned toward the direction of first stroke, and the second smart material 121b may be positioned toward the direction of second stroke.

That is, when the first stroke proceeds toward a positive direction of the second axis (for example, upper direction), the first smart material 121a is positioned toward the positive direction of the second axis with respect to the horizontal central plane (L2). Owing to this position of the first smart material 121, the actuator 120 moves toward the positive direction of the second axis when the first smart material 121a shrinks (being deformed) by the external signal applied thereto, to thereby perform the first stroke.

Also, when the second stroke proceeds toward a negative direction of the second axis (for example, lower direction), the second smart material 121b is positioned toward the negative direction of the second axis with respect to the horizontal central plane (L2). Owing to this position of the second smart material 121b, the actuator 120 moves toward the negative direction of the second axis when the second smart material 121b shrinks (being deformed) by the external signal applied thereto, to thereby perform the second stroke.

As shown in FIG. 3B, the smart materials 121a and 121b may be formed out of the horizontal central plane (L2) of the actuator 120, and simultaneously formed out of the vertical central plane (L1) of the actuator 120. That is, the smart materials 121a and 121b may be apart from each other in the second axis direction with respect to the horizontal central plane (L2), and may be apart from each other in a first axis direction with respect to the vertical central plane (L1). Also, the directional material 123 is formed in the horizontal central plane (L2) of the actuator 120; and the smart materials 121a and 121b are diagonally symmetric with respect to the directional material 123.

The smart materials 121a and 121b may include at least one of the first smart material 121a for the first stroke, and at least one of the second smart material 121b for the second stroke. In this case, the first smart material 121a may be positioned toward the direction of first stroke, and the second smart material 121b may be positioned toward the direction of second stroke.

That is, when the first stroke proceeds toward the positive direction of the second axis (for example, upper direction) and the positive direction of the first axis (for example, right or forward direction), the first smart material 121a is positioned toward the positive direction of the second axis with respect to the horizontal central plane (L2), and is also positioned toward the positive direction of the first axis with respect to the vertical central plane (L1). Owing to this position of the first smart material 121, the actuator 120 moves toward the positive direction of the second axis and the positive direction of the first axis when the first smart material 121a shrinks (being deformed) by the external signal applied thereto, to thereby perform the first stroke.

Also, when the second stroke proceeds toward the negative direction of the second axis (for example, lower direction) and the negative direction of the first axis (for example, left or backward direction), the second smart material 121b is positioned toward the negative direction of the second axis with respect to the horizontal central plane (L2), and is also positioned toward the negative direction of the first axis with respect to the vertical central plane (L1). Owing to this position of the second smart material 121b, the actuator 120 moves toward the negative direction of the second axis and the negative direction of the first axis when the second smart material 121b shrinks (being deformed) by the external signal applied thereto, to thereby perform the second stroke.

As shown in FIG. 4, the directional material 123 includes at least one of directional layer having a directional angle of 0°~180° with respect to a longitudinal direction of the smart materials 121a and 121b.

According to one embodiment of the directional material 123 shown in FIG. 4, the directional material 123 includes a first directional layer 123a having a first directional angle $\theta_1$, a second directional layer 123b having a second directional angle $\theta_2$, and a third directional layer 123c having a third directional angle $\theta_3$. Hereinafter, the directional angles of the directional material 123 having the first directional angle $\theta_1$, second directional angle $\theta_2$, and third directional angle $\theta_3$ will be expressed as $[\theta_1, \theta_2, \theta_3]$.

The directional material 123 may have specially orthotropic properties. Owing to the directional material 123 having the specially orthotropic properties, when the smart materials 121a and 121b are deformed by the external signal, that is, when the smart materials 121a and 121b are deformed in the top and bottom side with respect to the horizontal plane, the deformation is not restricted. In other words, the directional material 123 functions as the passive component for restricting deformation. However, if the directional material 123 has the specially orthotropic properties, the deformation is not restricted. Examples of the directional material 123 having the specially orthotropic properties will be cases where the first directional angle $\theta_1$ and the third directional angle $\theta_3$ can be offset from each other, for example, [0°, 90°, 0°] [45°, 90°, 135°]. When the directional material 123 is prepared by the directional angles being perpendicular to each other, their directionalities may be offset, whereby the deformation of actuator 120 is not restricted, as mentioned above.

The directional material 123 may have anisotropic properties. That is, the directional material 123 may be formed in such a manner that stiffness in a specific direction is greater than stiffness in other directions.

In case that the directional material 123 has the anisotropic properties, when the smart materials 121a and 121b are deformed by the external signal, twisting occurs with respect to the direction having the greater stiffness in the directional material 123.

That is, the directional material 123 functions as the passive component for restricting deformation. Accordingly, the deformation of bending and twisting may be simultaneously realized by combination of the smart materials 121a and 121b and directional material 123.

The directional material 123 having the anisotropic properties may comprise a plurality of directional layers which are not perpendicular to one another. These examples will be [30°, 90°, 30°], [45°, 90°, 45°], [60°, 90°, 60°], [45°, 30°, 45°], and [30°, 40°, 50°]. Especially, in case of the example [30°, 40°, 50°], when the first and third directional angles are asymmetric to each other, the twisting angles of the first stroke and second stroke become more asymmetric.

The aforementioned embodiments show the three directional layers. However, the number of directional layers for the directional material 123 is not limited to three. For example, the directional material 123 having the anisotropic properties may be formed by the two of directional layers being not perpendicular to each other.

For the above embodiments of the present invention, the smart materials 121a and 121b are formed in the upper/lower surface of the directional material 123. However, the structure of the actuator 120 according to the present invention is not limited to the above. For example, the smart materials 121a and 121b and directional material 123 may be formed inside the matrix 123 or may be formed in the surface of the matrix 125. That is, the directional material 123 may be formed in the top and bottom side with respect to the smart materials 121a and 121b, and the matrix 125 may surround the directional material 123 and smart materials 121a and 121b.

Referring once again to FIG. 1, the controller 130 induces the deformation of smart materials 121a and 121b by applying the external signal to the smart materials 121a and 121b. For example, in case of using the shape memory alloy for the smart materials 121a and 121b, the controller 130 supplies electric energy to the shape memory alloy, whereby heat generates in the shape memory alloy, and the heated shape memory alloy shrinks.

The controller 130 applies the external signal to the plural smart materials 121a and 121b at different application cycle so that the actuator 120 performs the first stroke in one direction, and also performs the second stroke in the opposite direction to the first stroke.

The controller 130 adjusts the intensity and application cycle of the external signal applied to the smart materials 121a and 121b, to thereby control the thrust and lift of the body 110. That is, the heat is generated when the electric energy is applied to the shape memory alloy, wherein shrinkage and displacement of the shape memory alloy depend on the intensity of heat generated. Thus, it may affect a motion speed of the actuator 120. Accordingly, the controller 130 controls the thrust of the actuator 120 by adjusting the intensity and application cycle of the electric energy.

When the actuator 120 is actuated in water, the shape memory alloy is cooled quickly. Thus, after stopping the supply of electric energy, recovery of the shape memory alloy becomes faster, which enables to shorten shrinkage and recovery time of the shape memory alloy.

Meanwhile, if forming a pair of actuators 120 which are symmetrically provided at the left and right sides with respect to the body 110, the controller 130 respectively applies the different external signals to the left and right actuators 120, to thereby change the moving direction of the body 110.

Hereinafter, the thrust produced by the flapping motion with the first and second strokes by the actuator 120 under control of the controller 130 will be explained as follows.

As shown in the above embodiments of the present invention, the deformation of bending and twisting occurs in the actuator 120 by combining the position of smart materials 121a and 121b and the directionality of directional material 123. Thus, when the controller 130 applies the external signal to the smart materials 121a and 121b included in the actuator 120 having the above structure, the smart materials 121a and 121b shrink (being deformed), whereby the deformation of bending and twisting occurs in the actuator 120.

The underwater robot based on flapping 100 according to the present invention can obtain the thrust by applying the deformation of bending and twisting of the actuator 120 to the first and second strokes.

Figure 5:
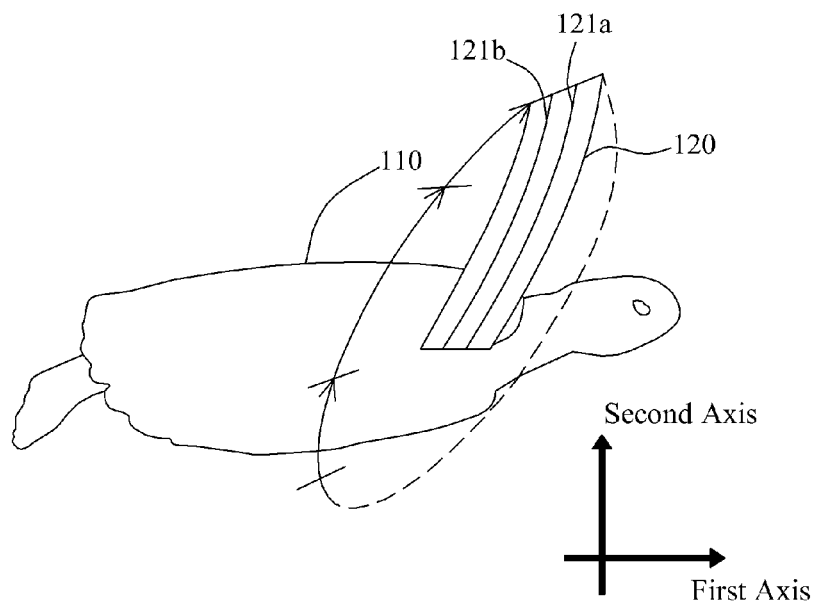
FIGS. 5 and 6 illustrate first and second strokes of actuator according to one embodiment of the present invention.
Figure 6:
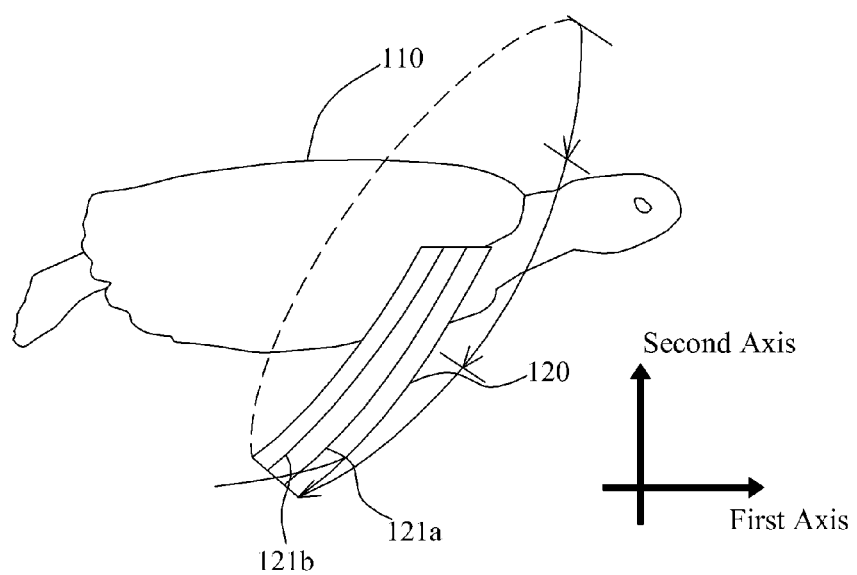

FIGS. 5 and 6 illustrate the first and second strokes of the actuator 120 according to one embodiment of the present invention.

As shown in FIG. 5, the direction of first stroke may proceed toward the positive direction of first axis and second axis. As shown in FIG. 6, the direction of second stroke may proceed toward the negative direction of first axis and second axis.

In order to obtain these directions of the stroke, the actuator 120 may have a cross section shown in FIG. 3B. That is, when the external signal is applied to the first smart material 121a, the first smart material 121a shrinks (being deformed), whereby the actuator 120 proceeds toward the positive direction of first axis and second axis. Also, the external signal is applied to the second smart material 121b, the second smart material 121b shrinks (being deformed), whereby the actuator 120 proceeds toward the negative direction of first axis and second axis.

The controller 130 operates the actuator 120 having the peculiar deformation of bending and twisting according to the position of smart materials 121a and 121b and the directionality of directional material 123, to thereby produce the thrust by the different twisting angles in the first and second strokes. If the twisting angles of first and second strokes are the same, the resultant force becomes offset during the repeated flapping motions, which makes it impossible to obtain the thrust.

Also, the controller 130 operates the actuator 120 having the peculiar deformation of bending and twisting according to the position of smart materials 121a and 121b and the directionality of directional material 123, to thereby produce the thrust by the resistance difference of fluid between the first and second strokes. For example, the resistance of fluid is decreased by adjusting the twisting of actuator 120 for the first stroke, and the resistance of fluid is increased by adjusting the twisting of actuator 120 for the second stroke, whereby the thrust is produced by the resistance difference of fluid between the first and second strokes.

Referring once again to FIG. 1, the underwater robot based on flapping 100 according to the present invention may further include the steering part 140 which includes the smart material, and the matrix for supporting the smart material and determining the external shape. That is, the steering part 140 is formed in the head or tail to be connected with the body 110, to thereby control the moving direction of the body 110.

The smart material included in the steering part 140 performs the bending deformation of the steering part 140. Meanwhile, if needed, the steering part 140 may include the directional material, which enables to perform the twisting deformation.

The actuator 120 may include a pair of main actuators (for example, turtle's forefeet) which are respectively connected with the front left and right sides of the body 110; and a pair of supplementary actuators (for example, turtle's rear feet) which are respectively connected with the rear left and right sides of the body 110. The main actuators provide the main thrust to the body 110, and controls the moving direction, if needed. The supplementary actuators provide the supplementary thrust to the body 110, and controls the moving direction, if needed.

Figure 7:
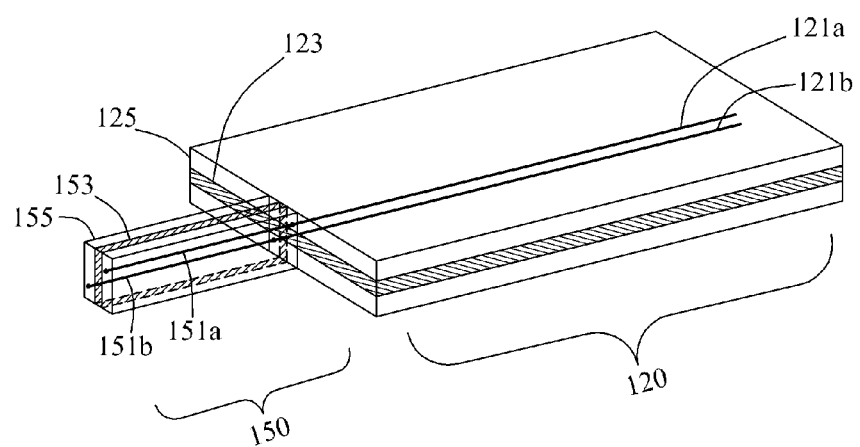
FIG. 7 illustrates a link part of underwater robot based on flapping according to the present invention.

FIG. 7 illustrates the link part of the underwater robot based on flapping 100 according to the present invention. As shown in FIG. 7, the underwater robot based on flapping 100 according to the present invention may include the link part 150. The link part 150 may be formed between the body 110 and actuator 120, to thereby maximize the bending and twisting deformation of the actuator 120.

The link part 150 may include smart materials 151*a* and 151*b* and directional material 153. If needed, the link part 150 may further include a matrix 155. The link part 150 may be formed as one body with the actuator 120. If needed, the actuator 120 may share the smart materials 121*a* and 121*b* with the link part 150.

Figure 8:
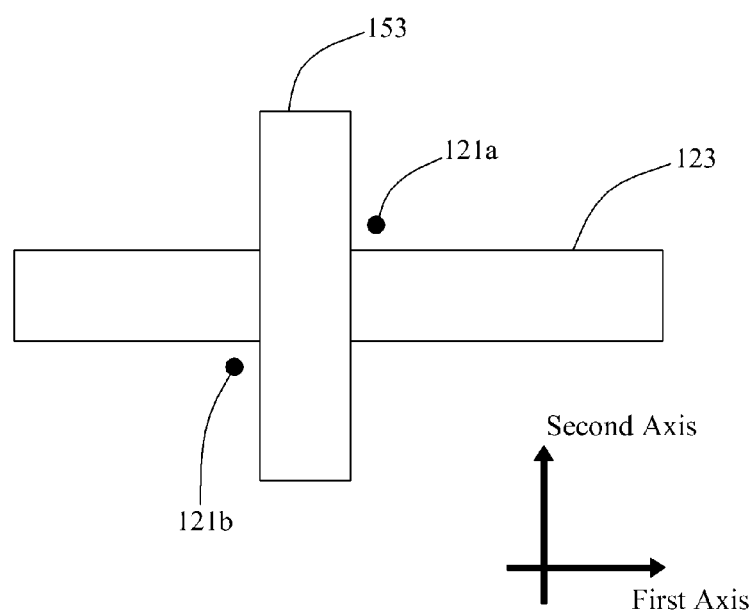
FIG. 8 is a cross sectional view illustrating a connection relation between link part and actuator.

FIG. 8 is a cross sectional view illustrating the connection relation between the link part 150 and actuator 120.

The link part 150 is connected with the actuator 120 at a predetermined angle. That is, as shown in one embodiment of FIG. 8, the link part 150 may be connected with the actuator 120 at an angle of 90°.

Also, the first smart material 121*a* and second smart material 121*b* are diagonally symmetric with respect to the crossing point of the directional material 153 of the link part 150 and the directional material 123 of the actuator 120. Accordingly, when the external signal is applied to the first smart material 121*a*, the link part 150 has the bending deformation in the positive direction of first axis and second axis. Also, when the external signal is applied to the second smart material 121*b*, the link part 150 has the bending deformation in the negative direction of first axis and second axis. Also, if the directional material 153 included in the link part 150 has the anisotropic properties, the link part 150 may perform the twisting deformation.

Thus, the bending and twisting deformation of the actuator 120 connected with the link part 150 may be maximized by the bending and twisting deformation of the link part 150.

Figure 9:
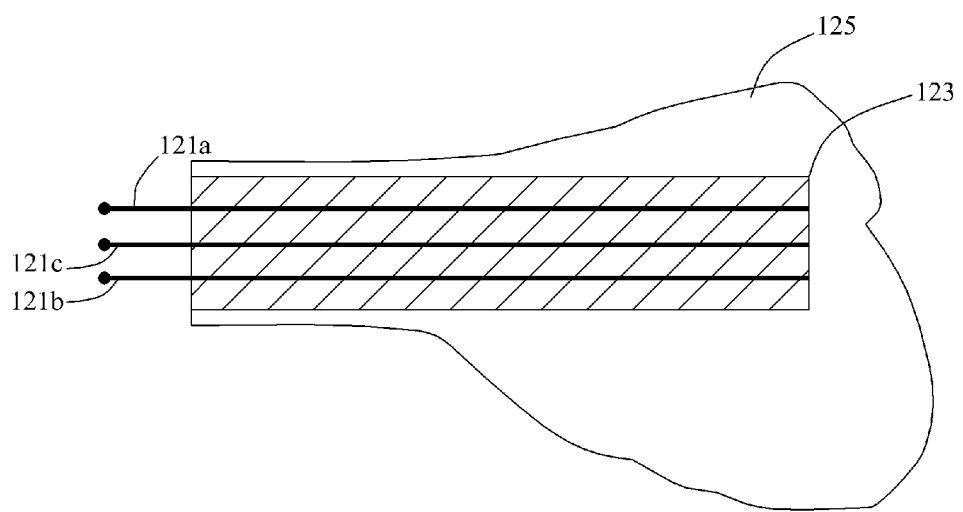
FIGS. 9 and 10 illustrate an actuator in an underwater robot based on flapping according to another embodiment of the present invention.
Figure 10:
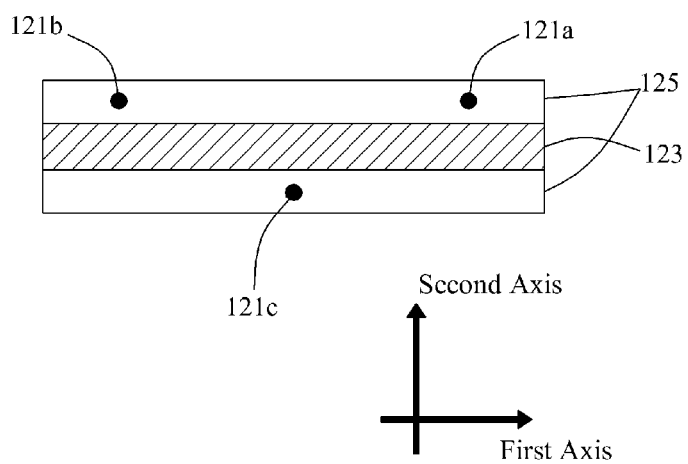

FIGS. 9 and 10 illustrate an underwater robot based on flapping according to another embodiment of the present invention.

As shown in FIGS. 9 and 10, an actuator 120 includes a first smart material 121*a*, second smart material 121*b*, third smart material 121*c*, directional material 123, and matrix 125.

A controller may perform the bending deformation in the positive direction of first axis and second axis of the actuator 120 by applying the external signal to the first smart material 121*a*; perform the bending deformation in the negative direction of first axis of the actuator 120 and the positive direction of second axis of the actuator 120 by applying the external signal to the second smart material 121*b*; and perform the bending deformation in the positive direction of second axis of the actuator 120 by simultaneously applying the external signal to the first smart material 121*a* and second smart material 121*b*. In this case, the actuator 120 may perform the twisting deformation according to the directionality of directional material 123. Also, the controller may perform the bending deformation in the negative direction of second axis of the actuator 120 by applying the external signal to the third smart material 121*c*.

If needed, the actuator 120 may be used for the supplementary actuator to be connected with the rear portion of the body.

Figure 11:
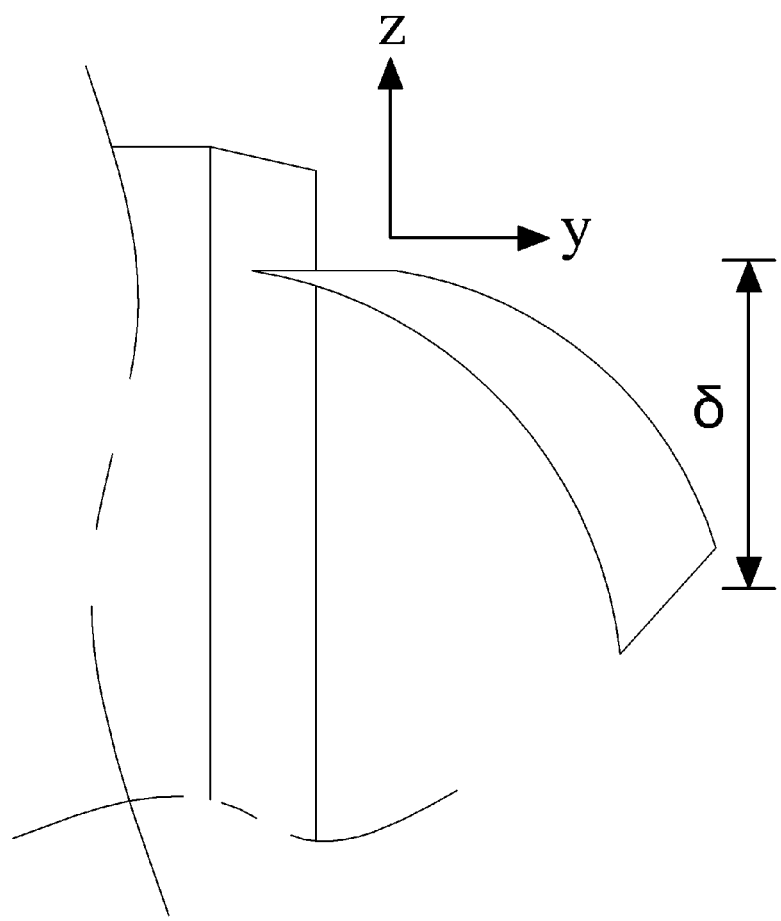
FIG. 11 illustrates an experimental device for measuring a bending deformation of actuator in the underwater robot based on flapping according to the present invention.
Figure 12:
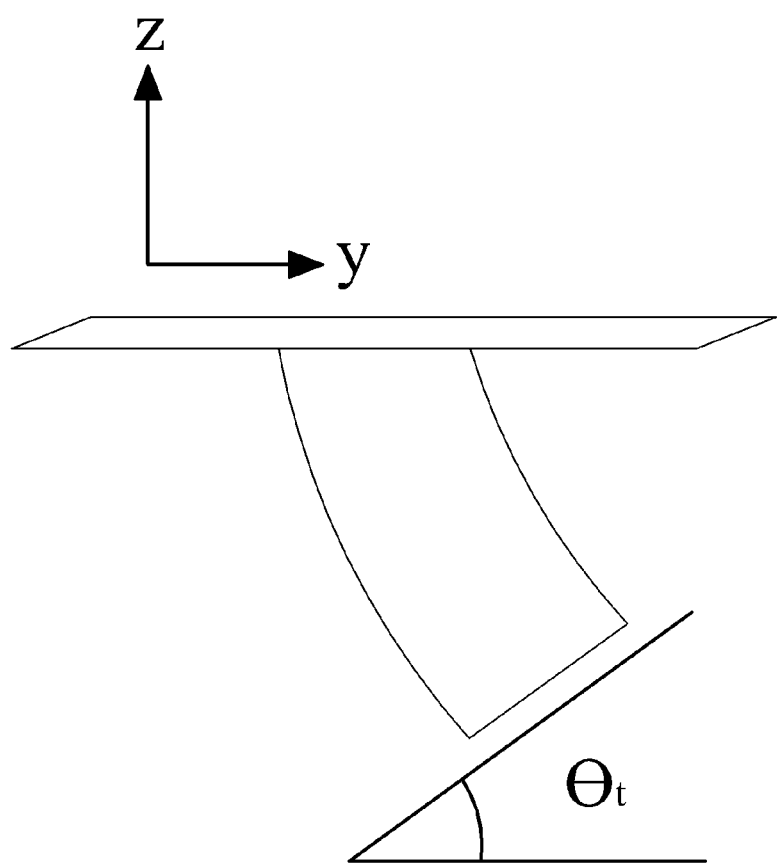
FIG. 12 illustrates an experimental device for measuring a twisting angle of actuator in the underwater robot based on flapping according to the present invention.

FIG. 11 illustrates an experimental device for measuring the bending deformation of the actuator in the underwater robot based on flapping according to the present invention. FIG. 12 illustrates an experimental device for measuring the twisting angle of the actuator in the underwater robot based on flapping according to the present invention.

As shown in FIG. 11, after the external signal is applied to the smart material, the bending deformation of actuator is compared with an un-deformed state of actuator, whereby the degree of bending deformation is measured in length (δ).

As shown in FIG. 12, after the external signal is applied to the smart material, the twisting angle of actuator is compared with an un-deformed state of actuator, whereby the twisting degree is measured in angle ($\theta_t$).

Figure 13:
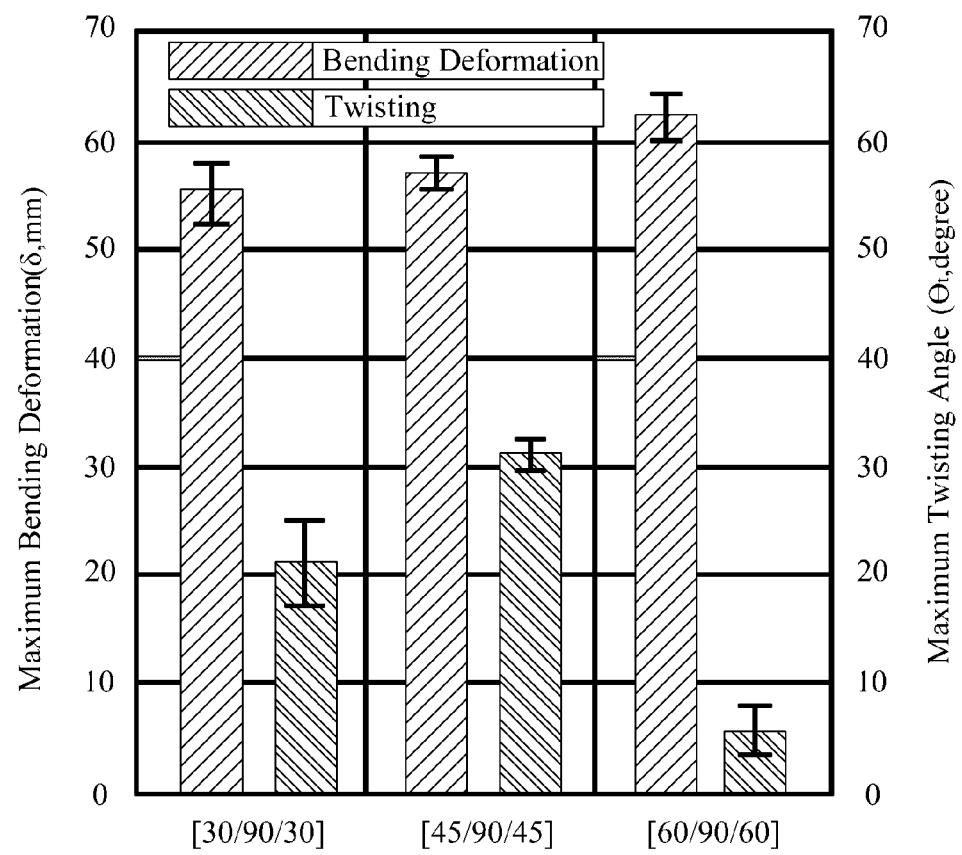
FIG. 13 shows experimental data obtained by measuring the maximum bending deformation and maximum twisting angle of a directional material including a plurality of directional layers having various directional angles.

FIG. 13 shows experimental data obtained by measuring the maximum bending deformation and maximum twisting angle of the directional material including the plurality of directional layers having the various directional angles.

The experimental data is obtained by using the directional material having the first to third directional angles of [30°, 90°, 30°], [45°, 90°, 45°], and [60°, 90°, 60°]. As know from the experimental results, the maximum twisting angle may be obtained by the directional material having the directional angles of [45°, 90°, 45°], and the maximum bending deformation may be obtained by the directional material having the directional angles of [60°, 90°, 60°].

Figure 14:
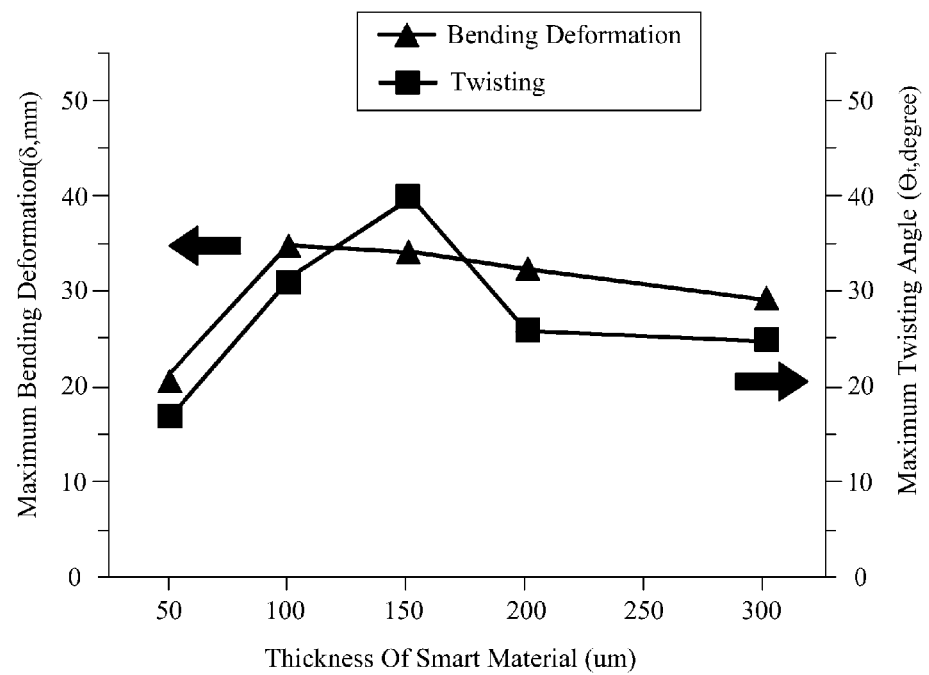
FIG. 14 shows experimental data obtained by measuring the maximum bending deformation and maximum twisting angle according to the thickness of smart material.

FIG. 14 shows experimental data obtained by measuring the maximum bending deformation and maximum twisting angle according to the thickness of smart material.

As shown in FIG. 14, the maximum bending deformation and maximum twisting angle are changed based on the thickness of smart material. As known from the experimental results, the maximum bending deformation may be obtained when the thickness of smart material is 100 μm; and the maximum twisting angle may be obtained when the thickness of smart material is 150 μm.

Figure 15:
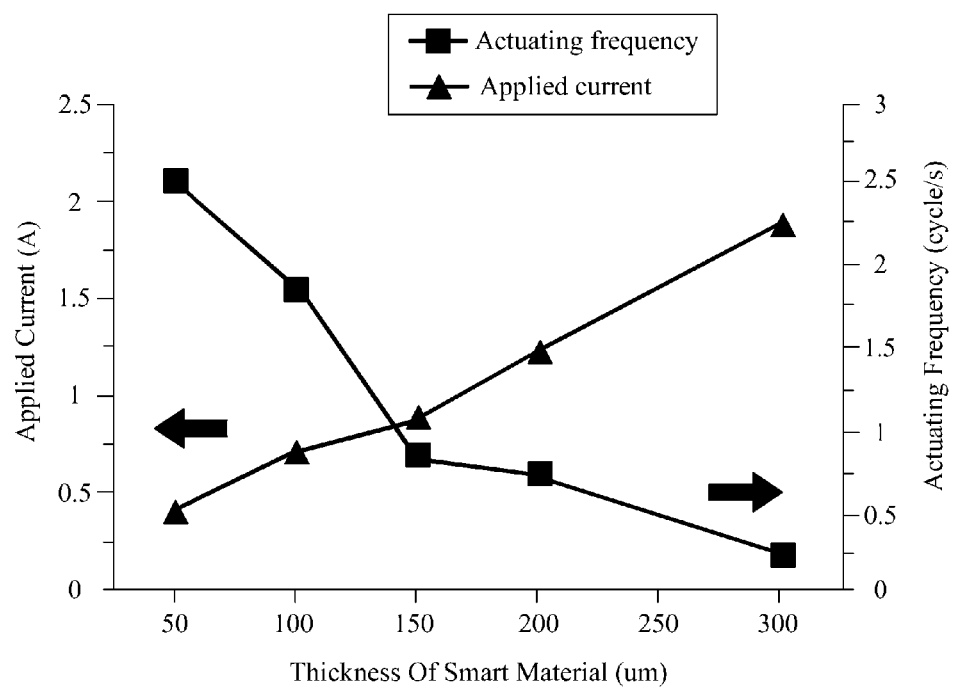
FIG. 15 shows experimental data obtained by measuring the change of applied current and actuating frequency according to the thickness of smart material.

FIG. 15 shows experimental data obtained by measuring the change of applied current and actuating frequency according to the thickness of smart material.

As shown in FIG. 15, according to the increase in thickness of smart material, the applied current is decreased, and the actuating frequency (cycle/s) is increased.

Figure 16:
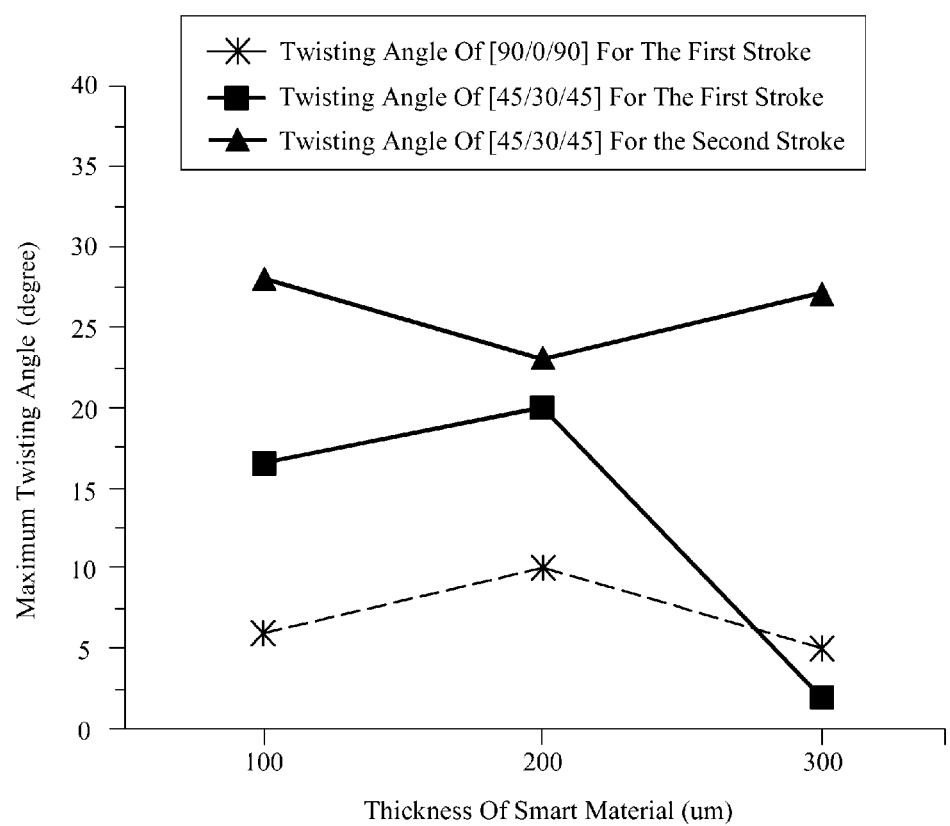
FIG. 16 shows experimental data obtained by measuring the maximum twisting angle of direction material according to the thickness of smart material.

FIG. 16 shows experimental data obtained by measuring the maximum twisting angle of direction material according to the thickness of smart material.

The twisting angle in the directional material having the directional angles of [45°, 30°, 45°] is larger than the twisting angle in the directional material having the directional angles of [90°, 0°, 90°].

Also, the twisting angle in the directional material having the directional angles of [45°, 30°, 45°] for the first stroke is different from the twisting angle in the directional material having the directional angles of [45°, 30°, 45°] for the second stroke. Especially, if the thickness of smart material is 300 μm, there is the largest difference of twisting angle between the first and second strokes. The thrust is produced in the actuator by using the difference of twisting angle between the first and second strokes, as mentioned above.

Figure 17:
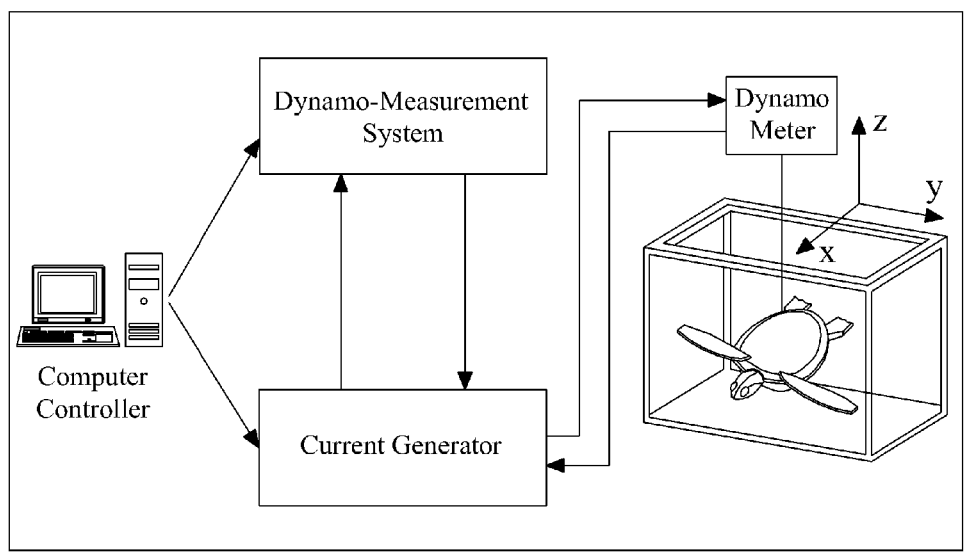
FIG. 17 illustrates an experimental device for measuring thrust produced by actuating the actuator of underwater robot based on flapping according to the present invention.

FIG. 17 illustrates an experimental device for measuring the thrust produced by actuating the actuator of the underwater robot based on flapping according to the present invention.

As shown in FIG. 17, after the underwater robot based on flapping is fixed to a dynamo-measurement system, the actuator is actuated by the current of 750 mA, and then a reaction force for thrusting water is measured.

Figure 18A:
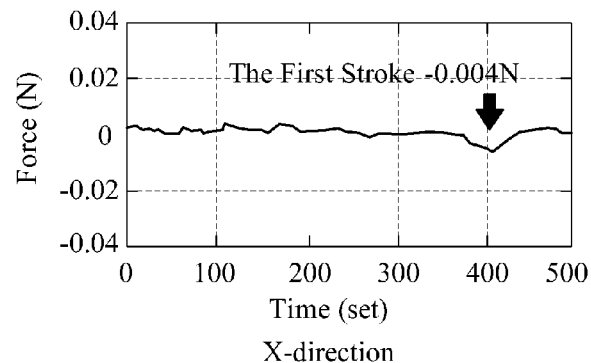
FIGS. 18A, 18B, and 18C shows experimental data measured by the use of experimental device shown in FIG. 17.
Figure 18B:
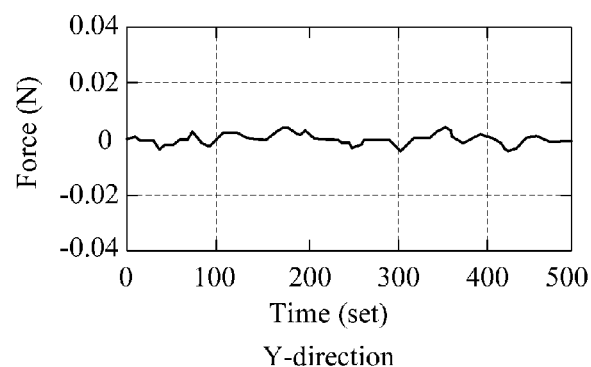
Figure 18C:
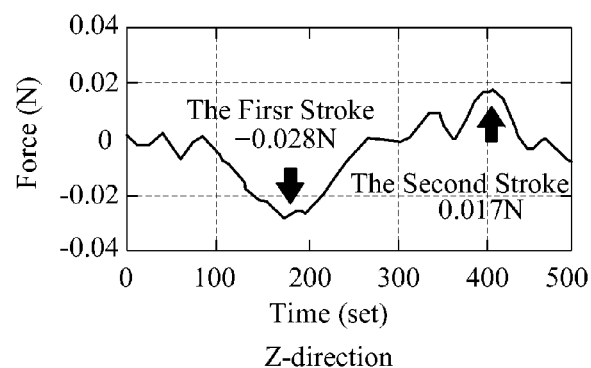

FIGS. 18A, 18B, and 18C shows experimental data measured by the use of experimental device shown in FIG. 17.

As shown in FIG. 18A, with respect to the X-axis direction (forward direction of the underwater robot), the actuator doesn't receive the force by the first stroke, however, the thrust of 0.004N is produced by the second stroke.

Accordingly, the underwater robot based on flapping according to the present invention is provided with the actuator which enables to simultaneously perform the smooth bending and twisting motion with the simple structure by adjusting the position of the smart material functioning as the active component, and the directionality of the directional material functioning as the passive component.

In comparison to the robot using the related art actuator, the underwater robot based on flapping according to the present invention facilitates to realize the simple structure, easy control, small size, and low poser consumption.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An underwater robot, comprising:
   an actuator having a first axis, a second axis orthogonal to the first axis, and a central horizontal plane orthogonal to the second axis, the actuator including:
      a first smart material having a longitudinal axis parallel with the central horizontal plane of the actuator and orthogonal to the first and second axes, and a second smart material having a longitudinal axis parallel with the central horizontal plane of the actuator and the longitudinal axis of the first smart material, the first smart material bending the actuator in a first direction and the second smart material bending the actuator in a second direction, and
      an anisotropic directional material in the central horizontal plane of the actuator that twists the actuator when the first and second smart materials bend the actuator,
      wherein each of the first and second smart materials changes its shape according to an external signal, and the first directional material restricts a deformation of the actuator;
   a body connected with the actuator; and
   a controller which makes the actuator perform a first stroke in the first direction, and a second stroke in the second direction;
   wherein the first and second smart materials extend from the body into the actuator, and the actuator simultaneously bends and twists according to positions of the first and second smart materials and a directionality of the anisotropic directional material.

2. The underwater robot according to claim 1, wherein the first directional material includes at least one directional layer having a directional angle of 0°~180° with respect to the longitudinal axes of the first and second smart materials.

3. The underwater robot according to claim 1, wherein the anisotropic directional material has a stiffness in one direction that is greater than a stiffness in another direction.

4. The underwater robot according to claim 1, wherein the first smart material is above the central horizontal plane of the actuator, and the second smart material is under the central horizontal plane of the actuator.

5. The underwater robot according to claim 4, wherein the first smart material is at one side of a central vertical plane of the actuator, and the second smart material is at another side of the central vertical plane of the actuator.

6. The underwater robot according to claim 1, wherein the actuator has different twisting angles between the first and second strokes.

7. The underwater robot according to claim 1, wherein the actuator produces thrust in a fluid by a resistance difference of the fluid between the first and second strokes.

8. The underwater robot according to claim 1,
   wherein the actuator includes a matrix which (i) supports the first and second smart materials and the first directional material and (ii) determines an external shape of the actuator, and the first and second smart materials and the first directional material are inside the matrix or on the surface of the matrix.

9. The underwater robot according to claim 1, wherein the controller induces deformation of the first and second smart materials by applying the external signal to the first and second smart materials.

10. The underwater robot according to claim 1, wherein the controller controls thrust and lift of the body by adjusting an intensity and an application cycle of the external signal applied to the first and second smart materials.

11. The underwater robot according to claim 1, further comprising a link part between the body and actuator, the link part including the first and second smart materials and an orthogonal anisotropic directional material.

12. The underwater robot according to claim 11, wherein the link part is connected with the actuator at a predetermined angle.

13. The underwater robot according to claim 1, wherein the actuator includes main actuators connected with front left and right sides of the body, and supplementary actuators connected with rear left and right sides of the body.

14. The underwater robot according to claim 8, further comprising a steering part that controls a direction of the body, wherein the steering part includes (i) a third smart material and (ii) a second matrix that supports the third smart material and determines an external shape of the steering part.

15. The underwater robot according to claim 1, wherein each of the first and second smart materials comprises a shape memory alloy (SMA), a piezoelectric element, an ionic polymer and metal composite (IPMC), or a conductive polymer (CP).

16. The underwater robot according to claim 1, wherein the first directional material comprises an ABS (acrylonitrile butadiene styrene copolymer) resin.

17. The underwater robot according to claim 8, wherein the matrix comprises at least one of an elastomeric polymer, silicon, or a polydimethylsiloxane (PDMS).

18. The underwater robot according to claim 11, wherein the orthogonal anisotropic directional material is at an angle of 90° with respect to the first directional material.

19. An underwater robot, comprising:
- a pair of actuators, each actuator having a first axis, a second axis orthogonal to the first axis, and a central horizontal plane orthogonal to the second axis, each actuator including:
  - a first smart material having a longitudinal axis parallel with the central horizontal plane of the actuator and orthogonal to the first and second axes, and a second smart material having a longitudinal axis parallel with the central horizontal plane of the actuator and the longitudinal axis of the first smart material, and a directional material, the first smart material bending the actuator in a first direction and the second smart material bending the actuator in a second direction, and
  - an anisotropic directional material in the central horizontal plane of the actuator that twists the actuator when the first and second smart materials bend the actuator,
  - wherein each of the first and second smart materials changes its shape according to an external signal, and the directional material restricts a deformation of the actuator;
- a body connected with each of the pair of actuators; and
- a controller which makes the pair of actuators perform a first stroke in the first direction, and a second stroke in the second direction;
- wherein the first and second smart materials extend from the body into each of the actuators, and the actuators simultaneously bend and twist according to positions of the first and second smart materials and a directionality of the anisotropic directional material.

20. The underwater robot according to claim 19, wherein each of the pair of actuators includes a matrix which supports the first and second smart materials and the directional material, and determines an external shape of the actuator; the first and second smart materials and the directional material are inside the matrix or on the surface of matrix; each of the first and second smart materials comprises a shape memory alloy (SMA), a piezoelectric element, an ionic polymer and metal composite (IPMC), or a conductive polymer (CP); the directional material comprises an ABS (acrylonitrile butadiene styrene copolymer) resin; and the matrix comprises at least one of an elastomeric polymer, silicon, or a polydimethylsiloxane (PDMS).

* * * * *